(12) United States Patent
Mabry

(10) Patent No.: US 7,886,015 B2
(45) Date of Patent: Feb. 8, 2011

(54) METHOD AND SYSTEM FOR FUTURE DEFINED EMAIL RECIPIENT

(75) Inventor: Joseph S. Mabry, Atlanta, GA (US)

(73) Assignee: International Business Machines Corporation, Armonk, NY (US)

( * ) Notice: Subject to any disclaimer, the term of this patent is extended or adjusted under 35 U.S.C. 154(b) by 85 days.

(21) Appl. No.: 12/169,030

(22) Filed: Jul. 8, 2008

(65) Prior Publication Data

US 2010/0011064 A1    Jan. 14, 2010

(51) Int. Cl.
G06F 15/16    (2006.01)

(52) U.S. Cl. .......................................... 709/206; 705/9

(58) Field of Classification Search .................. 709/206
See application file for complete search history.

(56) References Cited

U.S. PATENT DOCUMENTS

| | | | | |
|---|---|---|---|---|
| 5,530,861 | A * | 6/1996 | Diamant et al. ................. | 705/8 |
| 5,548,506 | A * | 8/1996 | Srinivasan ....................... | 705/8 |
| 5,822,526 | A * | 10/1998 | Waskiewicz ................. | 709/206 |
| 5,844,969 | A * | 12/1998 | Goldman et al. .......... | 379/93.24 |
| 5,978,836 | A * | 11/1999 | Ouchi ......................... | 709/206 |
| 2002/0078007 | A1* | 6/2002 | Herrero .......................... | 707/1 |
| 2003/0033271 | A1* | 2/2003 | Hendricks ...................... | 707/1 |
| 2003/0037044 | A1* | 2/2003 | Boreham et al. ............... | 707/3 |
| 2003/0088634 | A1 | 5/2003 | Friedman | |
| 2003/0101226 | A1 | 5/2003 | Quine | |
| 2004/0254989 | A1 | 12/2004 | Baratakke et al. | |
| 2005/0091318 | A1 | 4/2005 | Keohane et al. | |
| 2006/0047556 | A1* | 3/2006 | Lang et al. ..................... | 705/9 |
| 2006/0129602 | A1 | 6/2006 | Witriol et al. | |
| 2006/0167938 | A1 | 7/2006 | Muller et al. | |
| 2006/0168029 | A1* | 7/2006 | Fitzpatrick et al. .......... | 709/206 |
| 2006/0271381 | A1* | 11/2006 | Pui .............................. | 705/1 |
| 2008/0040189 | A1* | 2/2008 | Tong et al. ..................... | 705/9 |
| 2008/0189301 | A1 | 8/2008 | Chen et al. | |

FOREIGN PATENT DOCUMENTS

| | | |
|---|---|---|
| EP | 1469409 A1 | 10/2004 |
| JP | 10-254795 | 9/1998 |
| JP | 2006-107278 | 4/2006 |

OTHER PUBLICATIONS

Extended European Search Report dated Jun. 26, 2009.
Japan Office Action dated Sep. 10, 2009.

* cited by examiner

*Primary Examiner*—Asad M Nawaz
*Assistant Examiner*—Christopher D Biagini
(74) *Attorney, Agent, or Firm*—Driggs, Hogg, Daugherty & Del Zoppo

(57) ABSTRACT

Methods, systems and devices are provided for automatically sending e-mail to a future-designated recipient. E-mail servers accordingly send an e-mail categorized with respect to a target project group to each of a plurality of e-mail clients associated with each defined member of the target project group; add the sent e-mail or a copy thereof to a future-designated role recipient e-mail batch in a storage means, wherein the batch is categorized with respect to the group; define an identity of an undefined role member of the target project group, the defining providing an e-mail address; and automatically forward the categorized e-mail batch to an e-mail client associated with the provided e-mail address in response to the identity defining. Service methods are also provided, for example, by a service provider who offers to implement, deploy, and/or perform functions for others.

14 Claims, 3 Drawing Sheets

METHOD AND SYSTEM FOR FUTURE DEFINED EMAIL RECIPIENT

FIELD OF THE INVENTION

The present invention generally describes methods, systems and devices for email processing, and for sending messages to variable recipients.

BACKGROUND OF THE INVENTION

E-mail (or email) systems typically comprise server-based mail applications or programs configured to manage the exchange of file-based data items over one or more networks, including mentioning the exchange of electronic mail correspondence and documents between various users. E-mail systems offer simple but robust communication capabilities, facilitating the exchange of present and past (historic) e-mail communications between an almost unlimited plurality of senders and receivers, commonly including options that allow users to resend earlier communications to additional recipients as needed.

In one aspect, e-mail applications offer productivity advantages in work group scenarios, such as is common within corporate and organizational settings. E-mail recipients may be easily grouped into predefined or even dynamically defined workgroups, wherein e-mails on a given topic or subject may be batch e-mailed or forwarded to everybody in the group as needed, thus easily assuring that all members within a given group may receive documents and other e-mails intended to be commonly shared by members of the group. Moreover, batch e-mailing also may ensure that an e-mail reaches a target member of a given group: if the identity of the number is uncertain (for example, the recipient may be a task-based recipient and the sender may not know who is responsible for the given task), then e-mailing all members of the group will ensure that the target is reached.

Problems arise in adding a new member to an e-mail workgroup or other corporate entity and efficiently bringing that new member current with respect to prior e-mails and correspondences. For example, with respect to an extant group with incomplete or revised member identification, early and other previously-sent e-mails and information passed along via email is missed by individuals added to the group in later stages or revisions. Under prior art e-mail systems, upon addition of a new member to a group previous emails each have to be selected and forwarded to the new members, and other important information previously sent will not be known or shared with the new member unless this information is maintained separately for subsequent transmittal to any future newly-added members, which may be tedious, time-consuming and an inefficient use of corporate resources.

Thus, there is a need for improved methods and systems that address the above problems, as well as others.

SUMMARY OF THE INVENTION

Methods, systems and devices are provided for automatically sending e-mail to a future-designated recipient. E-mail servers accordingly send an e-mail categorized with respect to a target project group to each of a plurality of e-mail clients associated with each defined member of the target project group; add the sent e-mail or a copy thereof to a future-designated role recipient e-mail batch in a storage means, wherein the batch is categorized with respect to the group; define an identity of an undefined role member of the target project group, the defining providing an e-mail address; and automatically forward the categorized e-mail batch to an e-mail client associated with the provided e-mail address in response to the identity defining.

In another aspect, service methods are provided for deploying e-mail server applications, more particularly providing a computer infrastructure being operable to perform one or more of the method and/or process elements for automatically sending e-mail to a future-designated recipient described herein, for example, by a service provider who offers to implement, deploy, and/or perform functions for others. Still further, an article of manufacture comprising a computer usable medium having the computer readable program embodied in said medium may be provided. Such program codes comprise instructions which, when executed on a computer system, cause a computer system to perform one or more of the methods and/or process elements for automatically sending e-mail to a future-designated recipient. Moreover, systems, articles and programmable devices configured for performing one or more of the method and/or process elements of the present invention for automatically sending e-mail to a future-designated recipient, for example as described herein, are also disclosed.

BRIEF DESCRIPTION OF THE DRAWINGS

These and other features of the methods, systems and devices according to the present invention will be more readily understood from the following detailed description of the various aspects of the embodiments taken in conjunction with the accompanying drawings in which.

Figure 1A:
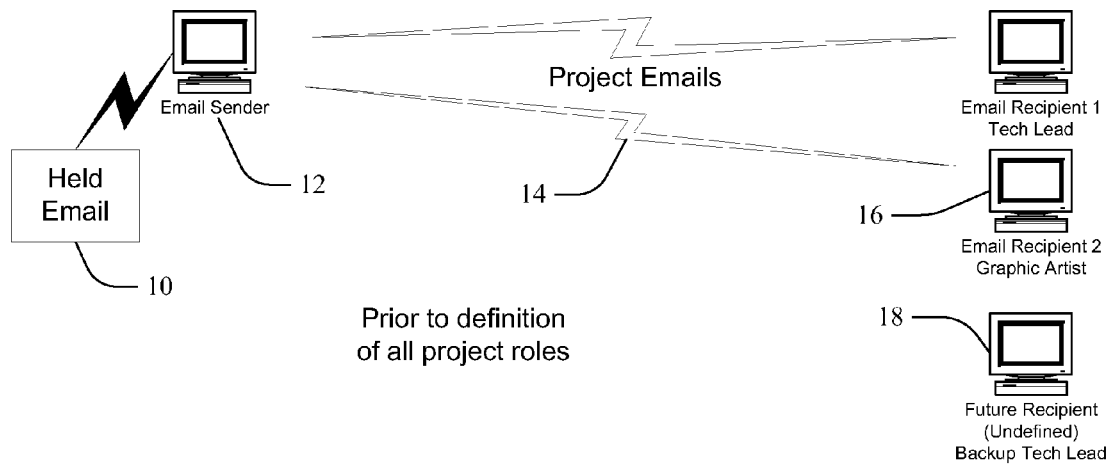
FIGS. 1A and 1B provide a block diagram illustration of a method and system for automatically sending historic emails to a future designated recipient according to the present application.

The drawings are not necessarily to scale. The drawings are merely schematic representations, not intended to portray specific parameters of the invention. The drawings are intended to depict only typical embodiments of the invention, and therefore should not be considered as limiting the scope of the invention. In the drawings, like numbering represents like elements.

DETAILED DESCRIPTION OF THE INVENTION

For convenience, the Detailed Description of the Invention has the following sections:
  I. General Description; and
  II. Computerized Implementation.

I. General Description

Figure 1B:
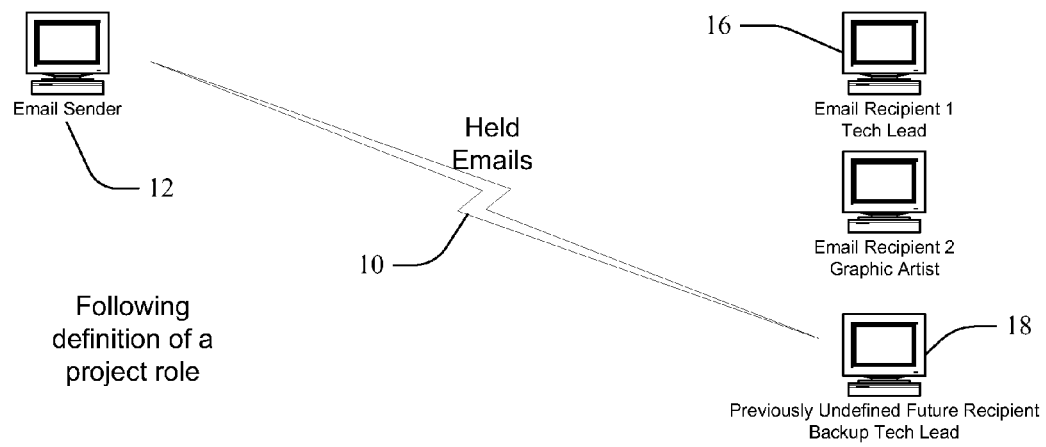

Referring now to FIGS. 1A and 1B, a method, system or process for automatically sending historic emails to a future designated recipient according to the present application is illustrated. In FIG. 1A an e-mail server 12 associated with a sender sends one or more project e-mails 14 associated with or categorized with respect to a group or task to each of a plurality of e-mail clients associated with each defined member 16 of a target project group: in the present example, to a "Tech Lead E-mail Recipient 1" and to a "Graphic Artist E-mail Recipient 2". In one aspect of the present application the project e-mails 14 are also intended to be received by a future-designated role or member of the group or associated with the task, wherein the future-designated role or member may include a role or member identity as-of-yet undefined or unfilled, as well as future-defined roles and members; in the present example the future-designated role/member is a Backup Tech Lead recipient 18. The e-mail server 12 holds copies or originals of each of the project e-mails, accumulating each presently and previously sent project email into a held e-mail group or batch 10.

In FIG. 1B the future recipient 18 is now defined, including by providing or assigning identity indicia comprising an e-mail address to the future-recipient role, and accordingly the e-mail sender 12 now automatically forwards each of the project e-mails 14 held in the held e-mail group/batch 10 to the previously undefined future-recipient 18 through use of the provided identity indicia. In some embodiments revising the identity of an existing or otherwise already-defined member is also recognized, wherein the held group/batch emails 10 are also forwarded to the newly revised member upon revising his or her identity indicia, thus in one aspect treating a member revision as a future-recipient definition event for purposes of the present application. Thus as the project roles/members 16/18 are revised or defined and a recipient designated/revised, recipients 16/18 may be automatically sent all previous project emails 14 for which the revised/previous e-mail recipient 16 or future recipient 18 was defined.

Figure 2:
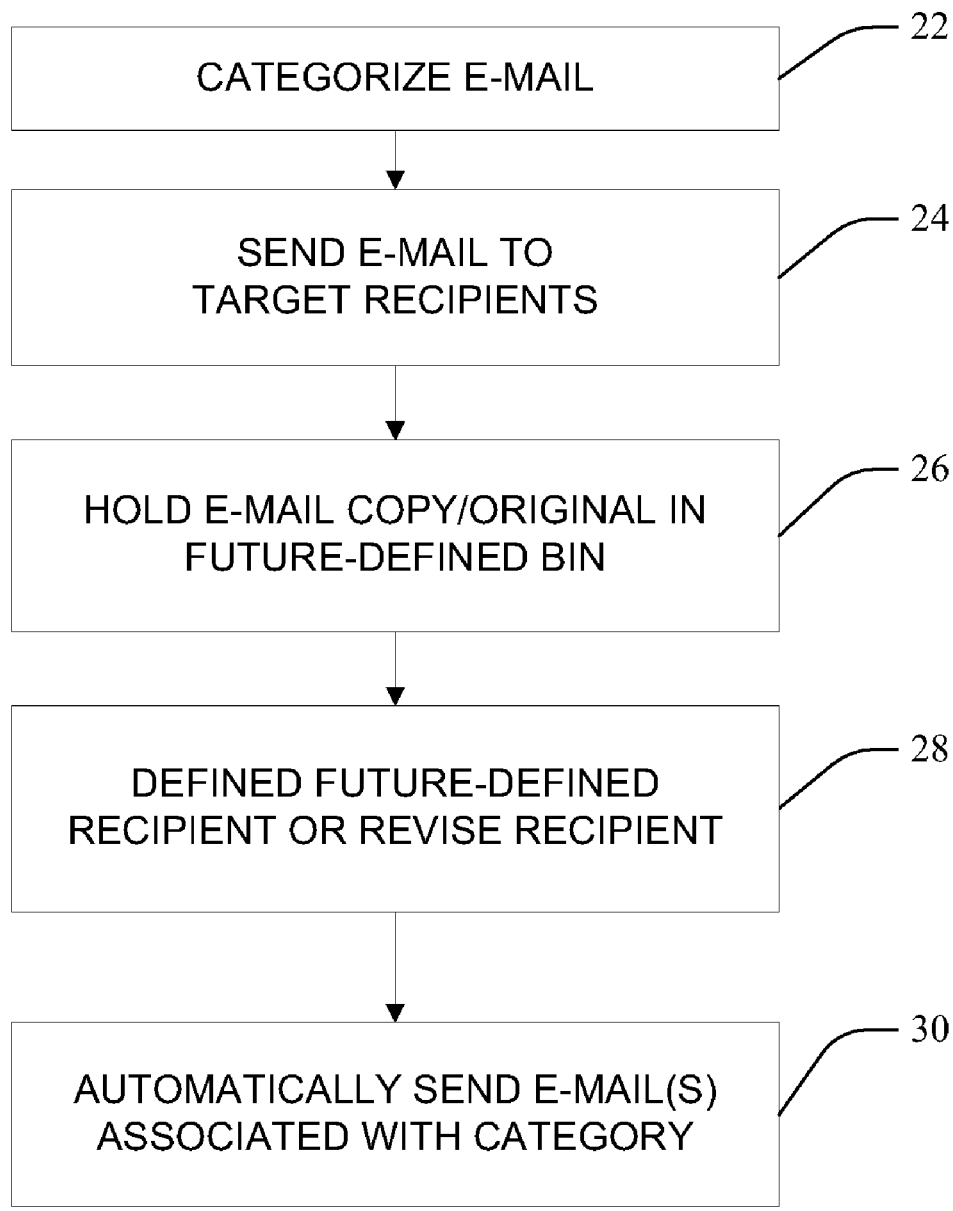
FIG. 2 is a flow chart illustrating a method and system for automatically sending historic emails to a future designated recipient according to the present application.

FIG. 2 provides a method, system or process for automatically sending historic emails to a future designated recipient according to the present application is illustrated. At 22 an e-mail is categorized; for example as associated with a task or as intended for each member of a group of e-mail recipients, and other e-mail categorizations appropriate for practicing with the present invention will be apparent to one skilled in the art. At 24 the categorized e-mail is sent to each target recipient as a function of the categorization, and at 26 the original categorized e-mail or a copy thereof is held in a future-defined recipient bin means. At 28 a future-defined recipient is identified in associated with the category; for example, a previously unfilled role within a group becomes filled, or the identity of a previously filled group member is revised and the identity revision is noted and entered at 28, or an e-mail recipient becomes associated with the category task. Accordingly, at 30 the e-mails held in the future-defined bin are automatically sent to the now defined or revised group member or recipient associated with the category task.

Figure 3:
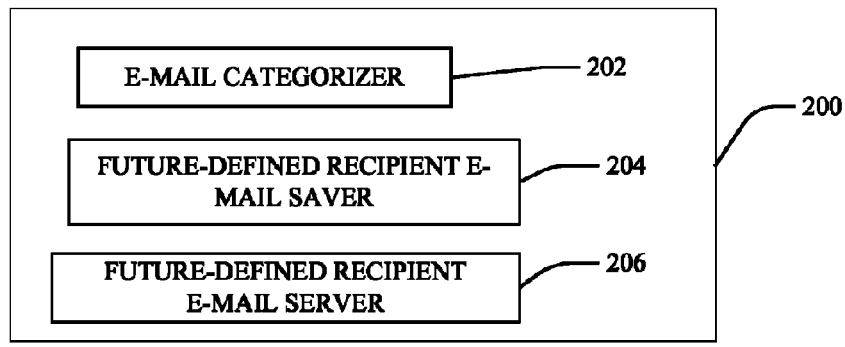
FIG. 3 is a system or device configured to provide for automatically sending historic emails to a future designated recipient according to the present application.

FIG. 3 illustrates an embodiment of a system or device 200 configured to automatically send historic emails to a future designated recipient according to the present application comprising: an e-mail categorizer logic component 202, an e-mail saver logic component 204 configured to identify and save e-mails categorized by the categorizer 202 for forwarding to a future-defined recipient, and a future-defined e-mail server logic component 206, each component readily understood by reference to the present application, for example with respect to the elements and processes described above with respect to FIGS. 1A, 1B and 2.

Thus according to the present application emails sent to a future designated recipient may be held in a sender's email account until a time when a future-designated recipient is defined, or a previously designated recipient is revised. At the time that a future-defined recipient is defined or revised any emails which would have included the formerly unspecified recipient as a recipient are then automatically sent to the newly-defined or identified recipient. In one aspect this provides advantages in corporate project scenarios by allowing normal project development to continue before all resources are defined, and by allowing development to continue uninterrupted once resources are defined, enabling necessary background information to be passed on to the new user who needs the information to complete his/her task or otherwise function within the group.

According to the present application e-mail recipient status may thus be defined according to a category or project role rather than a user's unique recipient identification: roles may be defined for a project and emails may be sent to one or more designated project roles. Thus all e-mails associated with a group, category or task may be sent to the newly-defined recipient, or a subset of held e-mails may be selected and sent as a function of the specific newly-defined role or revised role party. When a recipient joins a project and is given a role, emails for the recipient's project role may thus be automatically sent to the recipient.

In some embodiments of the present invention e-mails can be held on an e-mail server and sent to a newly identified recipient once the recipient is linked to a project role. In other embodiments emails may be held in a sender's email account and automatically sent to a newly identified recipient once the recipient is linked to a project role.

E-mail messaging processes and configurations based on recipient role/status rather than personal identity or persona provide advantages with respect to "distributed work team" concepts and implementations, in one respect due to the fact that the designations and identities of people within distributed work teams are often revised during the progress of a team project, and thus the present invention provides a means to capture and forward or otherwise provide historic e-mail and other relevant information and communications associated with the team project to each person associated with a team project role, providing a way for team members to have access to this data no matter when in a given time horizon they have joined the project.

In the case of project roles not being completely defined in the early stages of a project, in some embodiments a sender may send emails as normal with an additional option of adding one or more future-defined recipient placeholders to be defined at a later time. All emails that were destined for a future-defined recipient placeholder would be stored in either the sender's local mail file or on a mail server in some fashion. Once a resource is matched up with a category or project role in question, the sender may then enter an email program application and define an associated future-defined recipient by associating an email address of a new party filling that role with the previously specified future-defined recipient placeholder. E-mails that had been specified to be sent to that particular future-defined recipient may then be automatically be sent to the now defined email address, allowing the newly defined resource to have instant access to all foundational documents and information that had previously been sent to other team members, allowing the new resource to catch-up to the current status of other project team members.

Bringing the newly-defined resource up to date with project status is easier and more efficient compared with prior art processes and systems, which generally require a sender to either expressly identify and store all documents that would be beneficial to a future resource in a separate folder, or to review, identify and sort each previous e-mail associated with a given project for relevance to and appropriateness for forwarding to the newly defined resource.

II. Computerized Implementation

As will be appreciated by one skilled in the art, the present invention may be embodied as a system, method or computer program product. Accordingly, the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present invention may take the form of a computer program product embodied in any tangible medium of expression having computer usable program code embodied in the medium.

Any combination of one or more computer usable or computer readable medium(s) may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CDROM), an optical storage device, a transmission media such as those supporting the Internet or an intranet, or a magnetic storage device. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to wireless, wire line, optical fiber cable, RF, etc.

Computer program code for carrying out operations of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. Thus embodiments of the present invention comprise methods, apparatus (e.g. systems, devices, etc.) and computer program products. For example, it will be understood that each block of the flowchart illustrations and/or block diagrams of the figures, including FIGS. 1, 2 and 3 as described above, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

Referring now to FIGS. 1 and 2, the flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Figure 4:
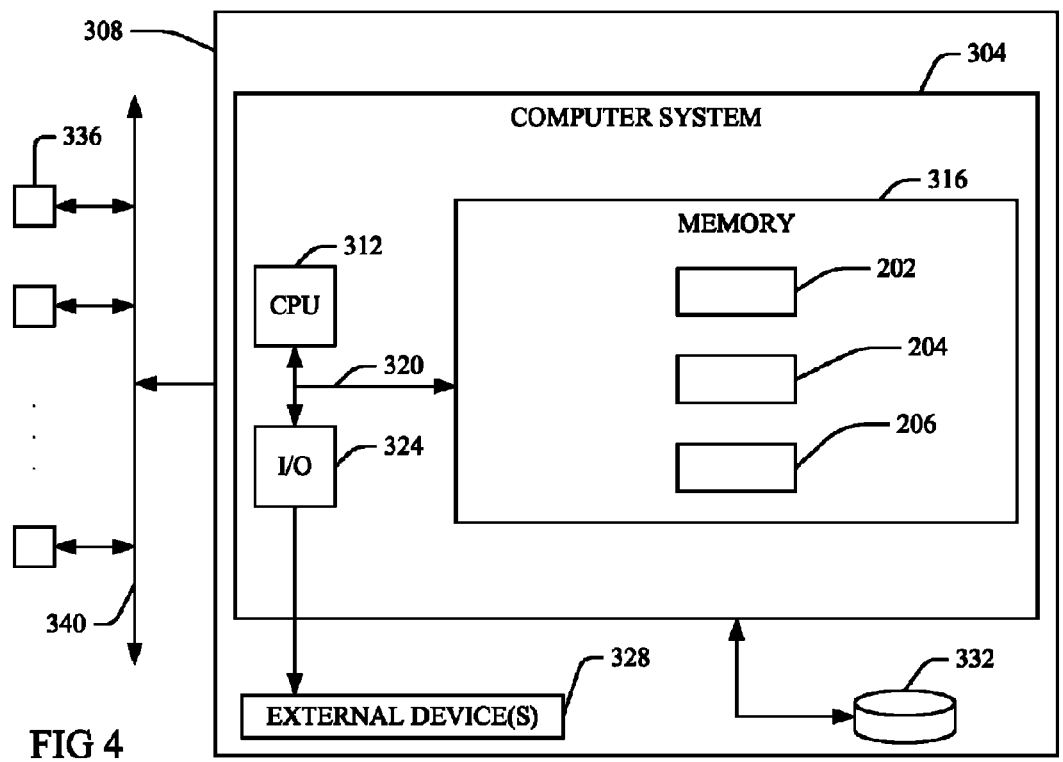
FIG. 4 is a block diagram illustrating a computerized device implementation of a method and system for automatically sending historic emails to a future designated recipient according to the present application.

Referring now to FIG. 4, an exemplary computerized implementation includes a computer system 304 deployed within a computer or e-mail server infrastructure 308 such as a computer or a programmable device such as a personal digital assistant (PDA) or cellular phone. This is intended to demonstrate, among other things, that the present invention could be implemented within a network environment 340 (e.g., the Internet, a wide area network (WAN), a local area network (LAN), a virtual private network (VPN), etc.) in communication with one or more additional computers 336, or on a stand-alone computer infrastructure 308. In the case of the former, communication throughout the network 340 can occur via any combination of various types of communication links. For example, the communication links can comprise addressable connections that may utilize any combination of wired and/or wireless transmission methods. Where communications occur via the Internet, connectivity could be provided by conventional TCP/IP sockets-based protocol, and an Internet service provider could be used to establish connectivity to the Internet.

As shown, the computer system 304 includes a central processing unit (CPU) 312, a memory 316, a bus 320, and input/output (I/O) interfaces 324. Further, the computer system 304 is shown in communication with external I/O devices/resources 328 and storage system 332. In general, the processing unit 312 executes computer program code, such as the code to implement various components of the process and system for implementing power savings on client-side computational devices as illustrated in FIGS. 1 and 2 and described above, for example including the e-mail categorizer 202, the future-defined recipient e-mail saver 204 and the future-defined recipient e-mail server 206 components discussed above, which are stored in memory 316 and/or storage system 332. It is to be appreciated that two or more, including all, of these components may be implemented as a single component.

While executing computer program code, the processing unit 312 can read and/or write data to/from the memory 316, the storage system 332, and/or the I/O interfaces 324. The bus 320 provides a communication link between each of the components in computer system 304. The external devices 328 can comprise any devices (e.g., keyboard, pointing device, display, etc.) that enable a user to interact with computer system 304 and/or any devices (e.g., network card, modem, etc.) that enable computer system 304 to communicate with one or more other computing devices.

The computer infrastructure 308 is only illustrative of various types of computer infrastructures for implementing the invention. For example, in one embodiment, computer infrastructure 308 comprises two or more computing devices (e.g., a server cluster) that communicate over a network to perform the various process steps of the invention. Moreover, computer system 304 is only representative of various possible computer systems that can include numerous combinations of hardware.

To this extent, in other embodiments, the computer system 304 can comprise any specific purpose-computing article of manufacture comprising hardware and/or computer program code for performing specific functions, any computing article of manufacture that comprises a combination of specific purpose and general-purpose hardware/software, or the like. In each case, the program code and hardware can be created using standard programming and engineering techniques, respectively. Moreover, the processing unit 312 may comprise a single processing unit, or be distributed across one or more processing units in one or more locations, e.g., on a client and server. Similarly, the memory 316 and/or the storage system 332 can comprise any combination of various types of data storage and/or transmission media that reside at one or more physical locations.

Further, I/O interfaces 324 can comprise any system for exchanging information with one or more of the external device 328. Still further, it is understood that one or more additional components (e.g., system software, math co-processing unit, etc.) not shown in FIG. 3 can be included in computer system 304. However, if computer system 304 comprises a handheld device or the like, it is understood that one or more of the external devices 328 (e.g., a display) and/or the storage system 332 could be contained within computer system 304, not externally as shown.

The storage system 332 can be any type of system (e.g., a database) capable of providing storage for information under the present invention. To this extent, the storage system 332 could include one or more storage devices, such as a magnetic disk drive or an optical disk drive. In another embodiment, the storage system 332 includes data distributed across, for example, a local area network (LAN), wide area network (WAN) or a storage area network (SAN) (not shown). In addition, although not shown, additional components, such as cache memory, communication systems, system software, etc., may be incorporated into computer system 304.

Still yet, computer infrastructure 308 is intended to demonstrate that some or all of the components of implementation could be deployed, managed, serviced, etc. by a service provider who offers to implement, deploy, and/or perform the functions of the present invention for others, for example by licensing methods and browser or application server technology according to the present invention to an internet service providers (ISP) or cellular telephone provider. In one embodiment, the invention may comprise a business method that performs the process steps of the invention on a subscription, advertising, and/or fee basis. Thus, a service provider can create, maintain, support, etc., a computer infrastructure, such as the computer infrastructure 308 that performs the process steps of the invention for one or more customers, and in return the service provider can receive payment from the customer(s) under a subscription and/or fee agreement and/or the service provider can receive payment from the sale of advertising content to one or more third parties.

The invention also provides for computer-implemented methods according to the present application. In this case, a computer infrastructure, such as computer infrastructure 308, can be provided and one or more systems for performing the process steps of the invention can be obtained (e.g., created, purchased, used, modified, etc.) and deployed to the computer infrastructure. To this extent, the deployment of a system can comprise one or more of: (1) installing program code on a computing device, such as computer system 304, from a computer-readable medium; (2) adding one or more computing devices to the computer infrastructure; and (3) incorporating and/or modifying one or more existing systems of the computer infrastructure to enable the computer infrastructure to perform the process steps of the invention.

As used herein, it is understood that the terms "program code" and "computer program code" are synonymous and mean any expression, in any language, code or notation, of a set of instructions intended to cause a computing device having an information processing capability to perform a particular function either directly or after either or both of the following: (a) conversion to another language, code or notation; and/or (b) reproduction in a different material form. To this extent, program code can be embodied as one or more of: an application/software program, component software/a library of functions, an operating system, a basic I/O system/driver for a particular computing and/or I/O device, and the like.

The foregoing description of various aspects of the invention has been presented for purposes of illustration and description. It is not intended to be exhaustive or to limit the invention to the precise form disclosed, and obviously, many modifications and variations are possible. Such modifications and variations that may be apparent to a person skilled in the art are intended to be included within the scope of the invention as defined by the accompanying claims.

The invention claimed is:

1. A method for automatically sending e-mail to a future-designated recipient, comprising:

setting a future-designated role recipient capable of identification and sending an e-mail categorized with respect to a target project group to each of a plurality of e-mail clients associated with each defined member of the target project group;

forming the target project group with a plurality of roles, wherein defining a member of the target project group comprises assigning personal identity indicia to the defined member role, the indicia comprising an e-mail address;

adding the sent e-mail or a copy thereof to a future-designated role recipient e-mail batch, wherein the batch is categorized with respect to the group;

revising a role for a current member of the target project group;

automatically forwarding previous e-mails for which the member with the revised role is defined to the member of the target project group with the revised role;

defining an identity of an undefined role member of the target project group with the e-mail address of the future designated role recipient; and automatically forwarding the categorized e-mail batch to an e-mail client associated with the e-mail address of the future designated role recipient in response to the identity defining;

accumulating all previous project emails intended for the undefined role member into the e-mail batch;

selecting a subset of previously held emails for the revised role; and storing task background information of the target project group for later forwarding to the undefined role member of the target project group.

2. The method of claim 1, further comprising categorizing the e-mail with respect to a task of the target project group associated with the future-designated role; and sending the categorized e-mail comprises selecting a subset at least one e-mail of the e-mail batch associated with the task and sending the subset at least one e-mail to a subset of the plurality of e-mail clients associated with an each defined member associated with the task.

3. The method of claim 1 wherein defining the identity of the undefined role member comprises revising an identity of a previously identified group role member.

4. The method of claim 1 wherein the role of the undefined role member is a placeholder for an undefined role.

5. A service for automatically sending e-mail to a future-designated recipient, comprising:

providing an e-mail server infrastructure configured to:

set a future-designated role recipient capable of identification and send an e-mail categorized with respect to a target project group to each of a plurality of e-mail clients associated with each defined member of the target project group;

form the target project group with a plurality of roles, wherein defining a member of the target project group comprises assigning personal identity indicia to the defined member role, the indicia comprising an e-mail address;

add the sent e-mail or a copy thereof to a future-designated role recipient e-mail batch in a storage means, wherein the batch is categorized with respect to the group;

revise an identity of an existing member of the target project group;

revise a role for a current member of the target project group;

automatically forward previous e-mails for which the member with the revised role is defined to the member of the target project group with the revised role;

forward held group batch emails to the member of the target project group with the newly revised identity; and automatically forward the categorized e-mail batch to an e-mail client associated with a provided e-mail address in response to defining an identity of an undefined role member of the target project group, the defining providing an e-mail address of the future designated role recipient;

accumulate all previous project emails intended for the undefined role member into the categorized e-mail batch;

select a subset of previously held emails for the revised role; and store task background information of the target project group for later forwarding to the undefined role member of the target project group.

6. The service of claim 5, wherein the e-mail server infrastructure is further configured to:

categorize the e-mail with respect to a task of the target project group associated with the future-designated role; and send the categorized e-mail by selecting a subset at least one e-mail of the e-mail batch associated with the task and sending the subset at least one e-mail to a subset of the plurality of e-mail clients associated with an each defined member associated with the task.

7. The service of claim 5, wherein the e-mail server infrastructure is further configured to define the identity of the undefined role member by revising an identity of a previously identified group role member.

8. A method for automatically sending e-mail to a future-designated recipient, comprising:

producing computer executable program code;

storing the code on a computer readable medium;

providing the program code to be deployed and executed on a computer system, the program code causing the computer system to:

set a future-designated role recipient capable of identification and send an e-mail categorized with respect to a target project group to each of a plurality of e-mail clients associated with each defined member of the target project group;

form the target project group with a plurality of roles, wherein defining a member of the target project group comprises assigning personal identity indicia to the defined member role, the indicia comprising an e-mail address;

add the sent e-mail or a copy thereof to a future-designated role recipient e-mail batch, wherein the batch is categorized with respect to the group;

revise a role for a current member of the target project group;

automatically forward previous e-mails for which the member with the revised role is defined to the member of the target project group with the revised role;

automatically forward the categorized e-mail batch to an e-mail client associated with a provided e-mail address in response to defining an identity of an undefined role member of the target project group, the defining providing an e-mail address of the future designated role recipient;

accumulate all previous project emails intended for the undefined role member into the categorized e-mail batch;

select a subset of previously held emails for the revised role; and store task background information of the target project group for later forwarding to the undefined role member of the target project group.

9. The method of claim 8, the program code comprising instructions which, when executed on the computer system, causes the computer system to:

categorize the e-mail with respect to a task of the target project group associated with the future-designated role; and send the categorized e-mail by selecting a subset at least one e-mail of the e-mail batch associated with the task and sending the subset at least one e-mail to a subset of the plurality of e-mail clients associated with an each defined member associated with the task.

10. The method of claim 8, the program code comprising instructions which, when executed on the computer system, causes the computer system to define the identity of the undefined role member by revising an identity of a previously identified group role member.

11. A programmable device comprising:

a processing means;

a memory in communication with the processing means comprising a logic component; and a network interface in communication with the processing means and the memory;

wherein the processing means is configured to:

set a future-designated role recipient capable of identification and send an e-mail categorized with respect to a target project group to each of a plurality of e-mail clients associated with each defined member of the target project group;

form the target project group with a plurality of roles, wherein defining a member of the target project group comprises assigning personal identity indicia to the defined member role, the indicia comprising an e-mail address;

add the sent e-mail or a copy thereof to a future-designated role recipient e-mail batch in a storage means, wherein the batch is categorized with respect to the group;

automatically forward the categorized e-mail batch to an e-mail client associated with a provided e-mail address in response to defining an identity of an undefined role member of the target project group, the defining providing an e-mail address of the future designated role recipient;

revise a role for a current member of the target project group;

automatically forward previous e-mails for which the member with the revised role is defined to the member of the target project group with the revised role;

revise the identity of an existing member of the target project group; and forward held group batch emails to the member of the target project group with the newly revised identity;

accumulate all previous project emails intended for the undefined role member into the categorized e-mail batch;

select a subset of previously held emails for the revised role; and store task background information of the target project group for later forwarding to the undefined role member of the target project group.

12. The programmable device of claim 11, wherein the processing means is configured to:

categorize the e-mail with respect to a task of the target project group associated with the future-designated role; and send the categorized e-mail by selecting a subset at least one e-mail of the e-mail batch associated with the task and sending the subset at least one e-mail to a subset of the plurality of e-mail clients associated with an each defined member associated with the task.

13. The programmable device of claim 12, wherein the processing means is configured to define the identity of the undefined role member by revising an identity of a previously identified group role member.

14. The programmable device of claim 13, wherein the role of the undefined role member is a placeholder for an undefined role.

* * * * *